United States Patent Office 3,338,712
Patented Aug. 29, 1967

---

3,338,712
NOVEL PHOTOGRAPHIC ELEMENT SENSITIZED BY LABILE SULFUR COMPOUNDS AND ORGANIC PHOSPHITES
Elvin Frederick William Thurston, Ilford, Essex, England, assignor to Ilford Limited, Essex, England, a British company
No Drawing. Filed June 23, 1964, Ser. No. 377,374
Claims priority, application Great Britain, July 3, 1963, 26,406/63
6 Claims. (Cl. 96—76)

This invention relates to improved photographic silver halide emulsions.

Silver halide emulsions may be sensitised in order to increase the intrinsic speed of the emulsions, so-called "chemical" sensitisation, or in order to increase the wavelength range over which the emulsion is sensitive, so-called "optical" sensitisation. Chemical sensitisation is considered to result either from the formation of silver sulphide on the surface of the silver halide crystals, so-called "sulphur sensitisation," or from the formation of small amounts of silver by the reduction of silver halide.

Sulphur sensitisation of an emulsion occurs during the emulsion-making process at the stage known as the digestion stage, in respect of which reference may be made to The Science of Photography Fountain Press, 1958, pages 74–76 or to the Ilford Manual of Photography, 5th Edition, 1958, pages 206–207.

Sulphur sensitisation of an emulsion during digestion can only occur if labile sulphur compounds are present in the gelatin which decompose during the digestion stage to form minute specks of silver sulphide on the surface of the silver halide crystals. These labile sulphur compounds may be initially present in the gelatin as naturally occurring substances or they can be added to so-called inert gelatin before the emulsion-making process is begun. Examples of labile sulfur compounds which can be added to inert gelatin in order to enable it to be sulphur sensitised are sodium thiosulphate and thiourea.

According to the invention there is provided a process for the production of a silver halide photographic emulsion which comprises forming a silver halide photographic emulsion containing labile sulphur compounds and adding to the emulsion, prior to or during the digestion thereof, from 5 mg. to 500 mg. per mole of silver present in the emulsion of an organic phosphite of the formula

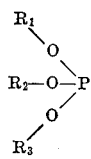

wherein $R_1$, $R_2$ and $R_3$ are alkyl, aralkyl or aryl and are the same or different.

The preferred concentration of organic phosphite is from 50 mg. to 250 mg. per mole of silver.

Examples of organic phosphites which are useful in the invention are trimethyl phosphite, triethyl phosphite and triphenyl phosphite.

The following examples will serve to illustrate the invention:

EXAMPLE 1

A fast iodobromide emulsion containing 3.2 mole percent of silver iodide was treated with sulphur sensitizer in the usual manner. Additions of triphenyl phosphite in the form of a 1% solution in acetone were added to the emulsion before the heat treatment necessary for chemical sensitization. After heating for the required time at 60° C. the emulsions were cooled, treated with a stabilizing compound, coated and dried. The coatings were exposed and tested in the usual manner to give the following sensitometric results.

| Emulsion Addition per gm. mole of Silver | Fog | Relative Log Speed | Contrast ($\gamma$) |
|---|---|---|---|
| Control (No addition) | 0.05 | 4.90 | 1.60 |
| Triphenyl phosphite: | | | |
| 6 mg | 0.06 | 4.96 | 1.80 |
| 18 mg | 0.06 | 5.00 | 1.60 |
| 48 mg | 0.05 | 5.12 | 1.50 |
| 160 mg | 0.06 | 5.06 | 1.40 |

EXAMPLE 2

The emulsion described in Example 1 was treated with trimethyl phosphite dissolved in ethyl alcohol. The results were as follows:

| Emulsion Addition per gm. mole of Silver | Fog | Relative Log Speed | Contrast ($\gamma$) |
|---|---|---|---|
| Control (No addition) | 0.32 | 4.99 | 1.4 |
| 150 trimethyl phosphite | 0.27 | 5.43 | 1.2 |

EXAMPLE 3

The emulsion described in Example 1 was treated with diphenyl isodecyl phosphite dispersed in 10% aqueous Teepol. The results were as follows:

| Emulsion Addition per gm. mole of Silver | Fog | Relative Log Speed | Contrast ($\gamma$) |
|---|---|---|---|
| Control | 0.06 | 5.00 | 1.35 |
| Diphenyl isodecyl phosphite: | | | |
| 66 mg | 0.04 | 5.11 | 1.30 |
| 330 mg | 0.02 | 5.12 | 1.30 |

EXAMPLE 4

The emulsion described in Example 1 was treated with di-isodecyl phenyl phosphite dissolved in acetone. The results were as follows:

| Emulsion Addition per gm. mole of Silver | Fog | Relative Log Speed | Contrast ($\gamma$) |
|---|---|---|---|
| Control | 0.07 | 5.02 | 1.30 |
| 66 mg. di-isodecyl phenyl phosphite | 0.09 | 5.23 | 1.10 |

EXAMPLE 5

The emulsion described in Example 1 was treated with Di(nonyl phenyl)phenyl phosphite
$(C_9H_{19}.C_6H_4.O)_2P.OC_6H_5$
in 10% aqueous Teepol. The results were as follows:

| Emulsion Addition per gm. mole of Silver | Fog | Relative Log Speed | Contrast ($\gamma$) |
|---|---|---|---|
| Control | 0.19 | 4.91 | 1.40 |
| Di (nonyl phenyl) phenyl phosphite: | | | |
| 66 mg | 0.19 | 4.95 | 1.30 |
| 330 mg | 0.06 | 5.20 | 1.30 |

The product Teepol is an anionic wetting or dispersing agent, the word Teepol being a registered trademark.

The term "relative log speed" used in the examples is directly related to the logarithm of the reciprocal of the exposure in metre candle seconds required to produce a density of 0.1 above fog. A higher figure indicates a higher speed.

The reason for the increase in speed in the case of the emulsions containing organic phosphites is not precisely known but it is evidently connected with the sulphur sensitising process since if the organic phosphite is added to an emulsion based on an inert gelatin and thus in the absence of labile sulphur compounds, or is added to an emulsion containing labile sulphur compounds after digestion has taken place, no speed increase is obtained.

While the present invention is of especial value in the production of gelatino silver halide emulsions, colloid substances other than gelatin may be used, e.g. polyvinyl alcohol. Emulsions containing non-gelatin binders, however, necessarily require the addition to them of suitable labile sulphur compounds.

It will be understood that the invention includes the new photographic emulsions, their production and photographic elements consisting of a support carrying one or more layers of a said emulsion.

It has been proposed in United States Patent No. 3,057,721 to add alkyl and aryl phosphites to emulsions which characteristically contain a tanning developer together with a non-tanning developer, in order to prevent a blue coloration appearing on aging of such emulsions. The use of organic phosphites in emulsions containing developer substances in quantity sufficient to effect development of the emulsion is not, however, included within the scope of the present invention.

In the foregoing formulae examples of alkyl groups are: methyl, ethyl, propyl, isopropyl, butyl, isobutyl, amyl, isoamyl, hexyl, octyl, nonyl, decyl and isodecyl, examples of aryl groups are phenyl and naphthyl and such groups containing substituents, e.g. alkyl substituents and examples of aralkyl are benzyl and phenylethyl.

I claim as my invention:

1. A photographic silver halide emulsion material which comprises a support carrying at least one layer of a silver halide emulsion free from any developing agent in quantity sufficient to effect development of the emulsion and containing labile sulphur compounds and from 5 mg. to 500 mg. per mole of silver present in the emulsion of an organic phosphite of the formula

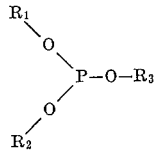

wherein $R_1$, $R_2$ and $R_3$ are each selected from the class consisting of alkyl, aryl and aralkyl.

2. A photographic silver halide emulsion material according to claim 1 wherein the organic phosphite is trimethyl phosphite.

3. A photographic silver halide emulsion material according to claim 1 wherein the organic phosphite is triphenyl phosphite.

4. A photographic silver halide emulsion material according to claim 1 wherein the organic phosphite is diphenyl isodecyl phosphite.

5. A photographic silver halide emulsion material according to claim 1 wherein the organic phosphite is di-isodecyl phenyl phosphite.

6. A photographic silver halide emulsion material according to claim 1 wherein the organic phosphite is di (nonyl-phenyl) phenyl phosphite.

References Cited

UNITED STATES PATENTS 3,057,721   10/1962   Cowden et al. _____ 96—28

NORMAN G. TORCHIN, *Primary Examiner.*